(12) United States Patent
Arya et al.

(10) Patent No.: US 7,088,553 B2
(45) Date of Patent: Aug. 8, 2006

(54) LAMINATED SUSPENSION LOAD BEAM DESIGN WITH DUAL PRIMARY METAL LAYERS SANDWICHING INTERMEDIATE SECONDARY LAYER

(76) Inventors: Satya Prakash Arya, 4935 Cruden Bay Ct., San Jose, CA (US) 95138; Tzong-Shii Pan, 1052 Lancer Dr., San Jose, CA (US) 95129

( * ) Notice: Subject to any disclaimer, the term of this patent is extended or adjusted under 35 U.S.C. 154(b) by 0 days.

(21) Appl. No.: 10/132,594

(22) Filed: Apr. 25, 2002

(65) Prior Publication Data

US 2003/0202285 A1 Oct. 30, 2003

(51) Int. Cl.
*G11B 5/48* (2006.01)

(52) U.S. Cl. .................... 360/244.3; 360/244.8

(58) Field of Classification Search .............. 360/244.3, 360/245.8, 244.8
See application file for complete search history.

(56) References Cited

U.S. PATENT DOCUMENTS

| | | | |
|---|---|---|---|
| 4,996,623 A | 2/1991 | Erpelding et al. | 360/104 |
| 5,594,607 A | 1/1997 | Erpelding et al. | 360/104 |
| 5,606,477 A | 2/1997 | Erpelding et al. | 360/104 |
| 5,650,894 A * | 7/1997 | Ikeda | 360/244.3 |
| 5,771,135 A | 6/1998 | Ruiz et al. | 360/104 |
| 5,844,751 A | 12/1998 | Bennin et al. | 360/104 |
| 5,862,010 A * | 1/1999 | Simmons et al. | 360/97.01 |
| 5,864,445 A | 1/1999 | Bennin et al. | 360/104 |
| 5,955,176 A * | 9/1999 | Erpelding et al. | 428/209 |
| 6,215,622 B1 | 4/2001 | Ruiz et al. | 360/244.3 |
| 6,600,631 B1 * | 7/2003 | Berding et al. | 360/244.3 |
| 6,636,382 B1 * | 10/2003 | Shiraishi | 360/244.3 |
| 2002/0181155 A1 * | 12/2002 | Takagi et al. | 360/244.3 |
| 2003/0007289 A1 * | 1/2003 | Shiraishi | 360/244.3 |
| 2003/0035245 A1 * | 2/2003 | Shiraishi | 360/244.3 |
| 2003/0074782 A1 * | 4/2003 | Shiraishi | 29/603.03 |

FOREIGN PATENT DOCUMENTS

JP 2001-43648 A * 2/2001

* cited by examiner

*Primary Examiner*—Jefferson Evans

(57) ABSTRACT

A suspension load beam for carrying a slider and read/write head elements in a magnetic data storage device is formed from a composite laminate material sheet that includes first and second primary layers respectively comprising first and second structural load bearing material sheets sandwiching an intermediate secondary layer comprising a third structural load bearing material sheet. The secondary layer is made of a different material than either of the first and second primary layers. One or more areas of reduced thickness are etched into one or both of the primary layers down to the secondary layer at one or more locations on the laminate material sheet.

33 Claims, 8 Drawing Sheets

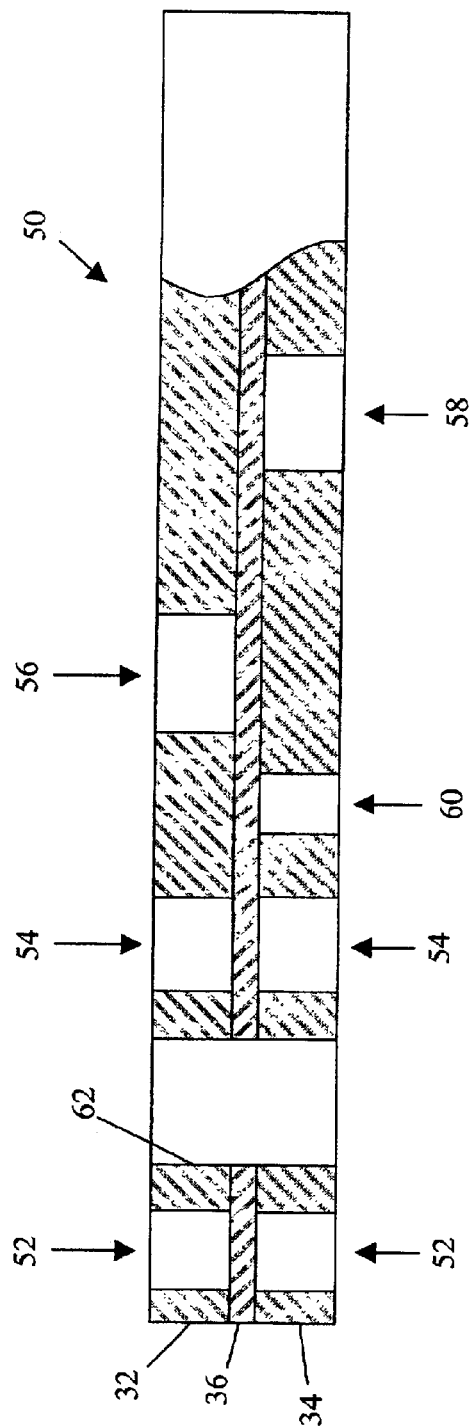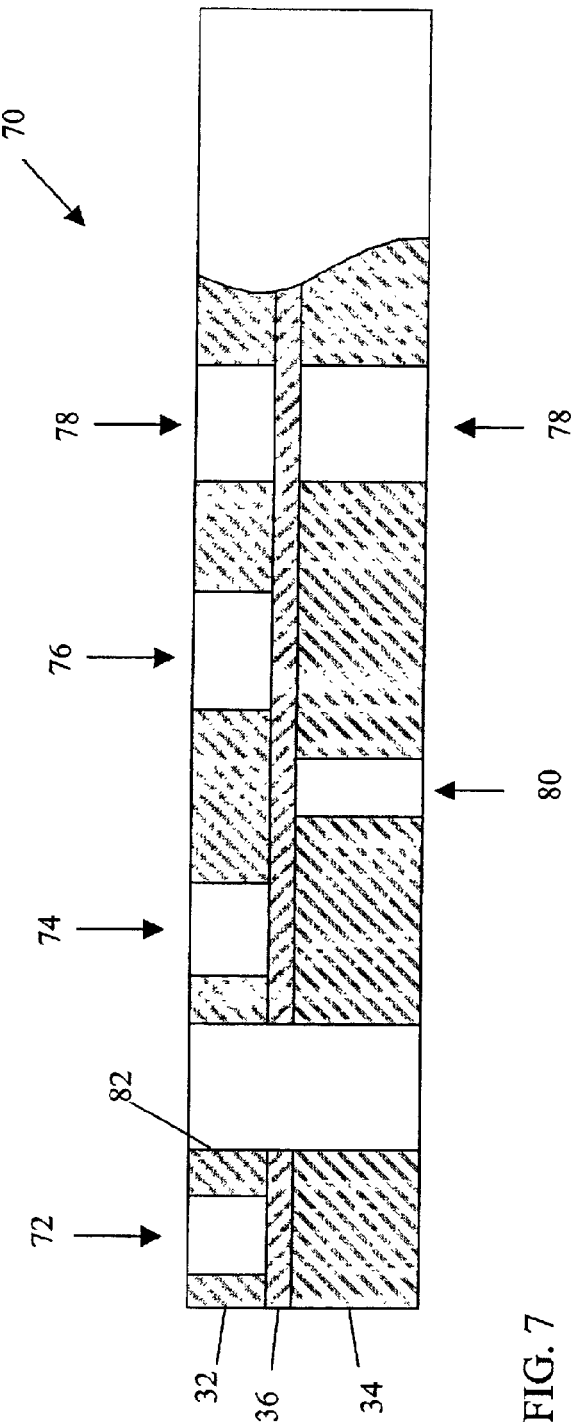

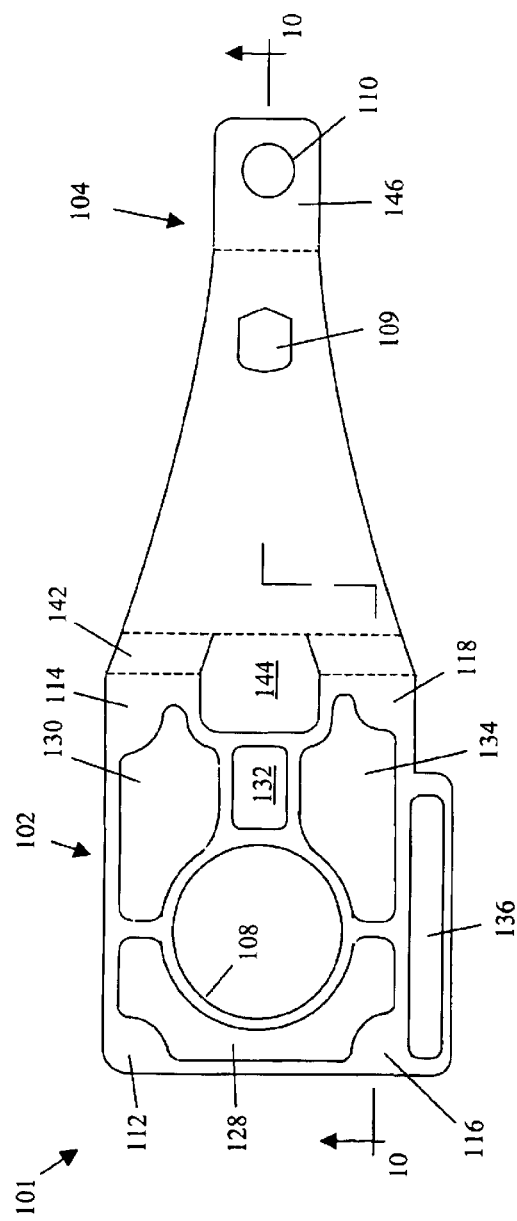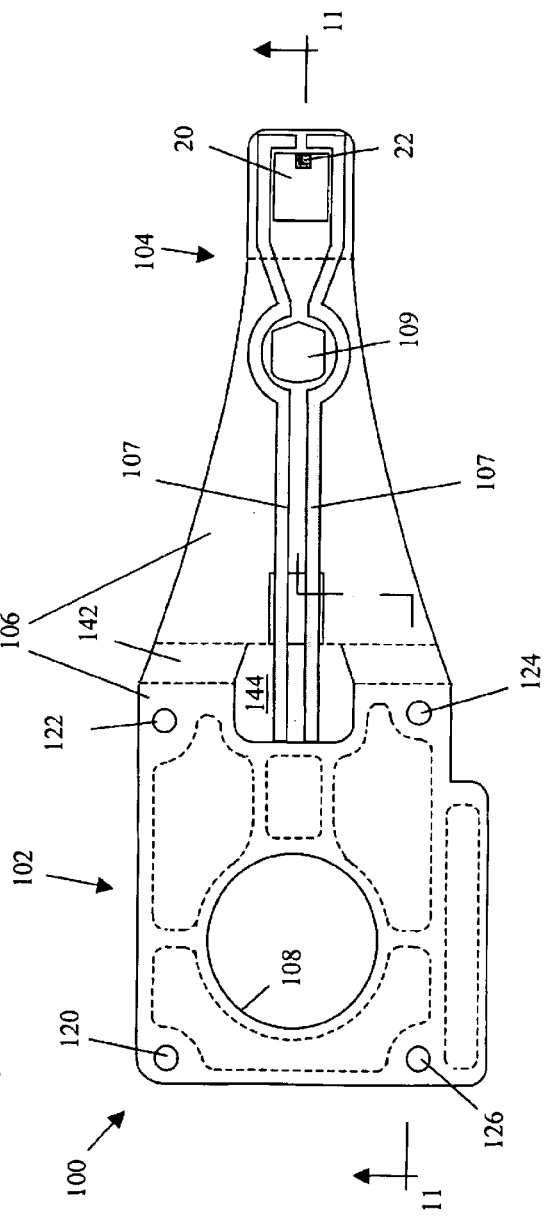
FIG. 8
FIG. 9

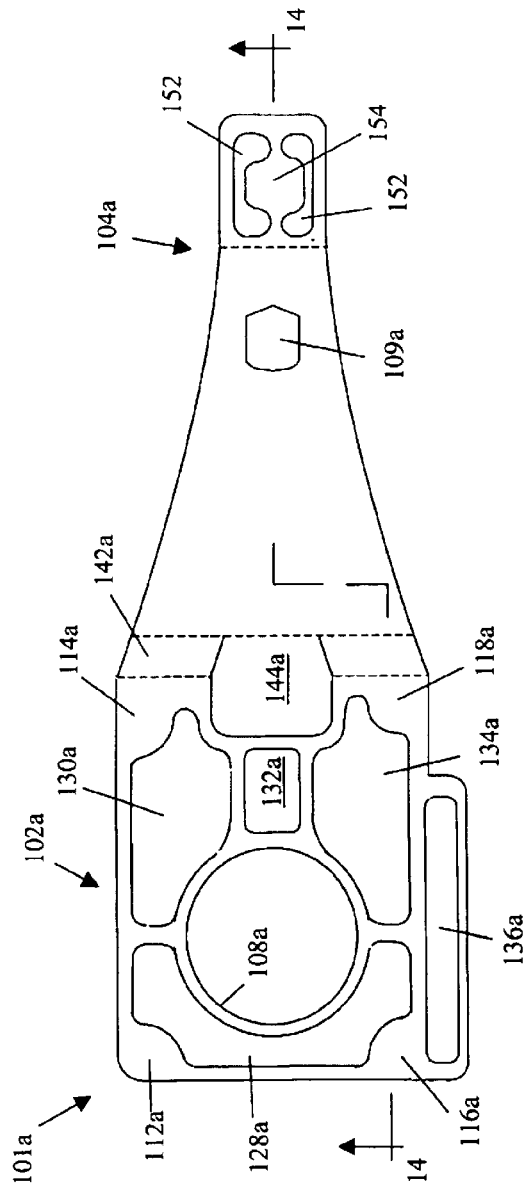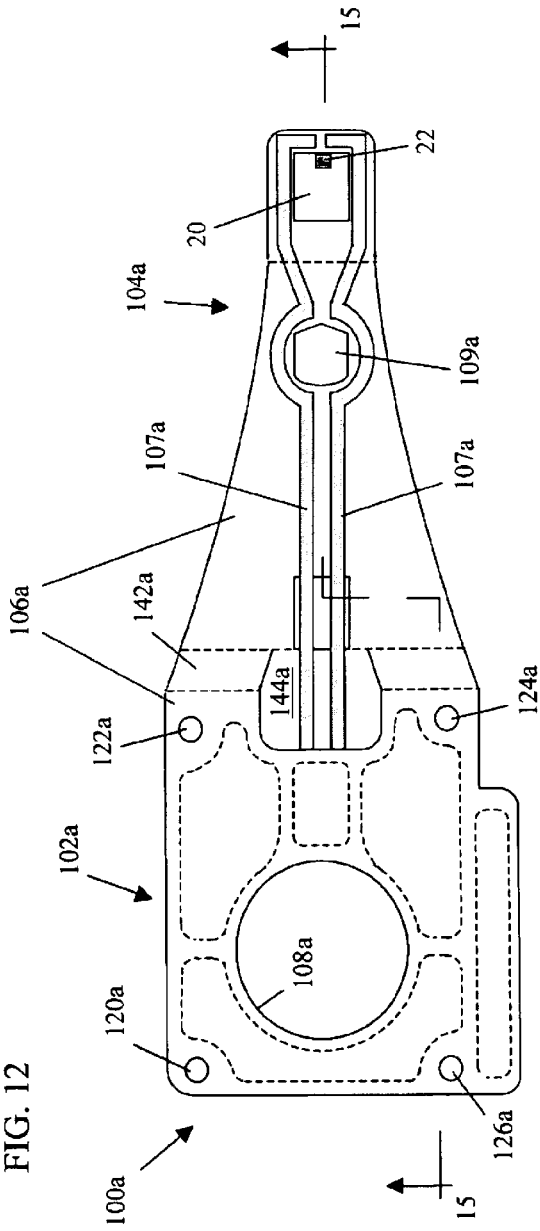
FIG. 12
FIG. 13

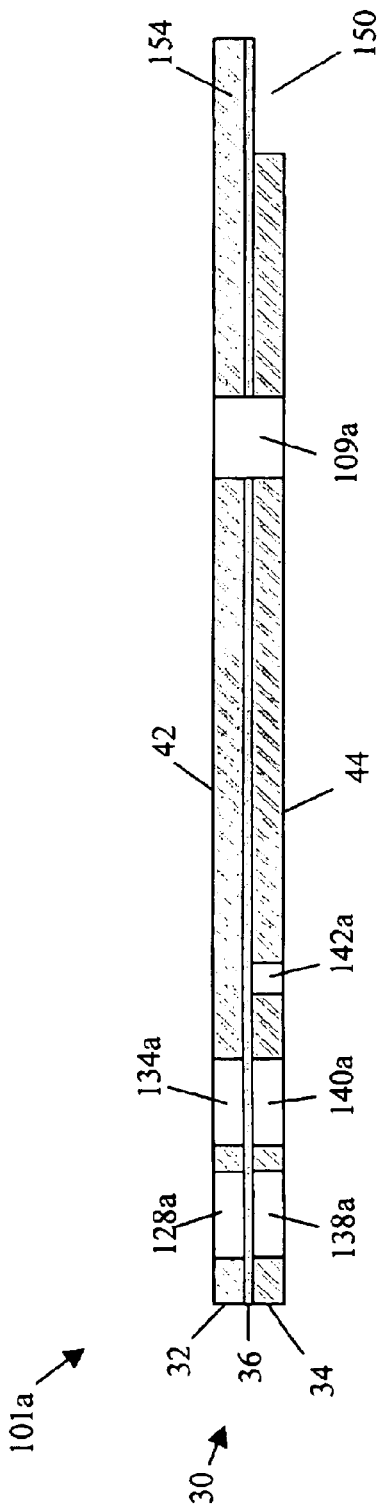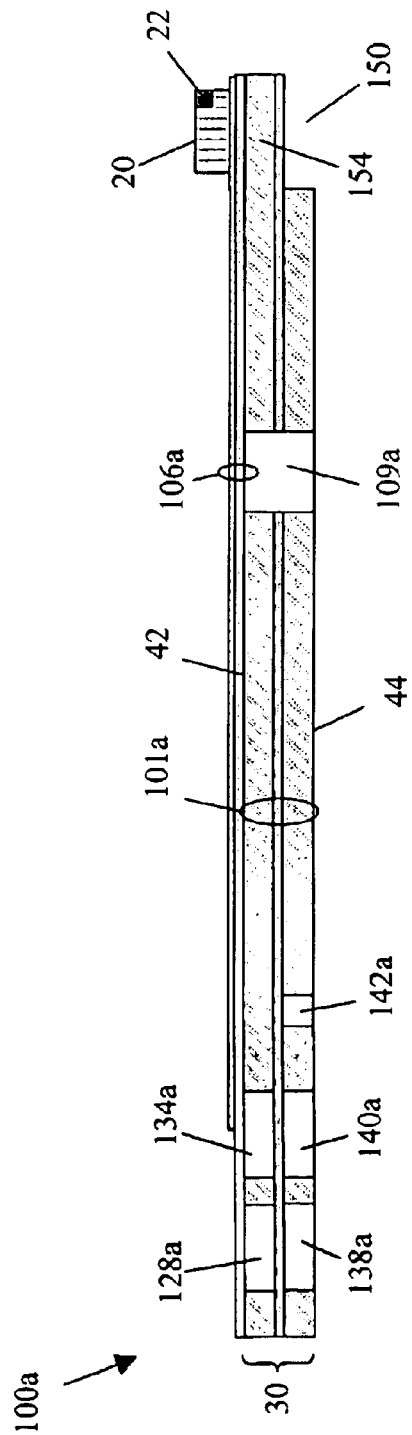

LAMINATED SUSPENSION LOAD BEAM DESIGN WITH DUAL PRIMARY METAL LAYERS SANDWICHING INTERMEDIATE SECONDARY LAYER

BACKGROUND OF THE INVENTION

1. Field of the Invention

The present invention relates to data storage apparatus for magnetically read and writing information on data storage media. More particularly, the invention concerns the fabrication of suspension assemblies designed to carry read/write heads in magnetic disk drive storage devices.

2. Description of the Prior Art

By way of background, a read/write head of a magnetic disk drive storage device ("disk drive") is typically incorporated on an air bearing slider that is designed to fly closely above the surface of a spinning magnetic disk medium during drive operation. The slider is mounted at the end of a suspension assembly that in turn is cantilevered from the arm of a pivotable actuator. When energized, the actuator sweeps the suspension across the disk surface, allowing the read/write head to read and write data in a series of concentric tracks.

The suspension of a conventional disk drive typically includes a relatively stiff load beam whose base end (known as the "mount plate") is attached to the actuator arm and whose free end (known as the "functional end") mounts a flexure that carries an associated slider and its integrated read/write head in a gimbaled configuration. Disposed between the mount plate and the functional end of the load beam is a "hinge" that is compliant in the vertical bending direction (normal to the disk surface). The hinge enables the load beam to suspend and load the slider and the read/write head toward the spinning disk surface. It is then the job of the flexure to allow the read/write head to pitch and roll in order to adjust its orientation for unavoidable disk surface run out or flatness variations.

The foregoing suspension components are quite small. A typical suspension is about 18 mm in length. The load beam typically has a thickness of between about 0.03–0.1 mm and the flexure typically has a thickness of between about 0.02–0.03 mm. The slider is typically about 1.25 mm long×1.00 mm wide×0.30 mm thick, and the read/write head carried thereon is a fraction of that size.

A design requirement of a disk drive suspension load beam is that it be sufficiently compliant in the vertical bending direction to facilitate proper gram loading of the slider and read/write head relative to the supportive air bearing force. At the same time, the load beam must be relatively stiff in the horizontal direction (parallel to the disk surface) to prevent off-track sway misalignment. It must also be torsionally stiff to prevent off-track rotational misalignment. In addition to these static structural requirements, the load beam must have good dynamic characteristics to prevent unwanted vibration and flutter. Excessive gain caused by resonance at critical dynamic frequencies can induce unwanted torsion, sway and bending, all of which can contribute to track misregistration problems, excessive noise, and undue wear. Dynamic design considerations have become particularly acute as recording density and TPI (Tracks Per Inch) requirements continue to increase. This has necessitated higher track servoing bandwidths, which in turn has established a need for higher dynamic performance suspensions.

Historically, suspension load beams have been fabricated by combining several stainless steel sheet stock elements to form the mount plate, the hinge and the functional end. In some designs, a single sheet of stainless steel has stainless steel pieces welded to it to develop the required thicknesses for the mount plate and the functional end. The hinge is then defined by the initial sheet material that lies between the welded pieces. In other designs, the mount plate, the hinge and the functional end are assembled from three different pieces of stainless steel sheet stock that are welded together.

A disadvantage of welded load beam designs is that welding adds more processing steps and can introduce thermal distortions. Individual thin material hardness is also difficult to control. These conditions lead to flatness variations relative to the principal plane of the load beam. Flatness is an important parameter to control because a non-flat load beam profile can cause suspension flutter due to air flow at operational disk rotation speeds. Welding also tends to reduce the real estate available for components such as piezoelectric milliactuators or the like. There are also free vibrating lengths of material between the weld points that contribute to dynamic flutter and mode gains at critical frequencies, thereby adversely affecting performance.

In recent years, manufacturers have begun using partial etch processes to produce disk drive suspensions as an alternative to welded constructions. According to this approach, fabrication begins with a sheet of stainless steel sheet stock that is rolled to a desired thickness using a rolling reduction technique. Photo-chemical partial etching is then employed to form areas of reduced thickness in the rolled material, such as the hinge section. In addition, partial etched pockets can be formed to reduce load beam mass and inertia without sacrificing the required static and dynamic stiffness characteristics.

In general, the use of photochemical etch processing allows load beams to perform much better than conventionally formed load beams that have not been etched. This approach has also been found to offer a great deal of design freedom because many elaborate pocket geometries can be formed, thereby allowing dynamic characteristics to be fine-tuned by distributing load beam mass and stiffness in strategic fashion.

Notwithstanding its advantages, photochemical etching generates excessive tolerances in the vertical direction normal to the principal plane of the load beam. Such tolerances can be 2–4 times that of the rolled starting material. This can produce unacceptable variations in gram loading and torsional dynamic characteristics. The problem is that the tolerances required to produce satisfactory pocket depth uniformity are at the process limits of photo-chemical etching. Although the depth of material removed is substantially a linear function of the length of time the metal is exposed to the chemical etching solvent, there are a number of variables that affect the ability to precisely control the amount of metal removed. Such variables include temperature, chemical contamination, chemical solvent concentration, impurities in both solvent and metal, and initial metal thickness.

A proposed solution to this problem is discussed in commonly-assigned U.S. Pat. No. 6,215,622 (the "'622 patent"). According to the '622 patent, a suspension member is formed as a laminate that includes at least two metallic material sheets with an etch retardant layer between the metallic sheets. The etch retardant layer acts as an etch stop when etching one or both of the metallic sheets, thereby controlling the amount of material removed and preserving thickness tolerances within acceptable levels. Although the technique disclosed in the '622 patent represents an important step forward in the design of etched suspension structures, it is believed that further improvements can be realized in the fabrication of such components. In particular, it should be noted that the '622 patent proposes a construction wherein either a deposition process (for a metallic etch stop layer) or an adhesive bonding process (for a thermoplastic etch stop layer) is used to apply the etch stop layer to one of the metallic sheets. Thereafter, the etch stop layer-coated metallic sheet is rolled against another metallic sheet in a cladding operation, thereby bonding the sheets together. Fabrication of the suspension components of the '622 patent thus involves at least two separate fabrication operations; namely, a deposition or bonding operation followed by a cladding operation. It should also be noted that the etch stop layer is very thin. For example, if the etch stop layer comprises a metal, it is ideally only a few atoms thick. If the etch stop layer is a thermoplastic material, it will be about 1–7 microns in thickness. In either case, the etch stop layer is not intended to perform a load bearing function in the suspension member.

It is submitted that a new manufacturing method that improves upon the above-described suspension construction techniques is warranted. What would be particularly desirable is a manufacturing method that allows partially etched suspension components to be formed without the attendant disadvantages of the above-described prior art technique.

SUMMARY OF THE INVENTION

The foregoing problems are solved and an advance in the art is obtained by an improved method of manufacturing a suspension load beam designed to carry a read/write head in a data storage device. According to preferred implementations of the invention, the suspension load beam is formed from a composite laminate material sheet that includes first and second primary layers respectively comprising first and second structural load bearing material sheets sandwiching an intermediate secondary layer comprising a third structural load bearing material sheet. The secondary layer is made of a different material than either of the first and second primary layers. The first and second primary layers respectively define first and second surfaces of the laminate material sheet, and have respective first and second nominal thicknesses lying in a direction that is substantially normal to the first and second surfaces of the laminate material sheet. These thickness can be the same for each primary layer or different for each such layer. One or more areas of reduced thickness are etched into one or both of the primary layers down to the secondary layer at one or more locations on the first or second surfaces of the laminate material sheet.

The primary layers can be made from stainless steel and the secondary layer can be made from copper. Other materials may also be used for either or both of the primary layers, and for the secondary layer.

The one or more areas of reduced thickness are preferably formed using a chemical etching process. The reduced thickness areas can include one or more areas formed by etching only one of the first or second primary layers. The reduced thickness areas can also include one or more areas formed by etching both of the first and second primary layers at the same location.

The one or more reduced thickness areas can be configured to define a load beam hinge and/or one or more pockets designed to reduce load beam mass. The one or more pockets can include single layer pockets formed in only one of the first or second primary layers. Alternatively, the one or more pockets can include dual layer pockets formed in each of the first and second primary layers at opposing locations on the laminate material sheet.

The invention further contemplates a suspension assembly and a disk drive incorporating a load beam constructed according to the inventive method.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 6 is a diagrammatic cross-sectional view of the laminate material sheet of FIG. 4 showing exemplary etch processing thereof;

FIG. 7 is a diagrammatic cross-sectional view of the laminate material sheet of FIG. 5 showing exemplary etch processing thereof;

FIG. 8 is a plan view of an exemplary load beam constructed in accordance with the invention for use in a dimpled suspension;

FIG. 9 is plan view of a dimpled suspension incorporating the load beam of FIG. 8;

FIG. 12 is a plan view of an exemplary load beam constructed in accordance with the invention for use in an integrated gimbal suspension;

FIG. 13 is plan view of an integrated gimbal suspension incorporating the load beam of FIG. 12;

FIG. 14 is a cross-sectional view taken along line 14—14 in FIG. 12; and FIG. 15 is a cross-sectional view taken along line 15—15 in FIG. 13.

DETAILED DESCRIPTION OF PREFERRED EMBODIMENTS

Figure 1:
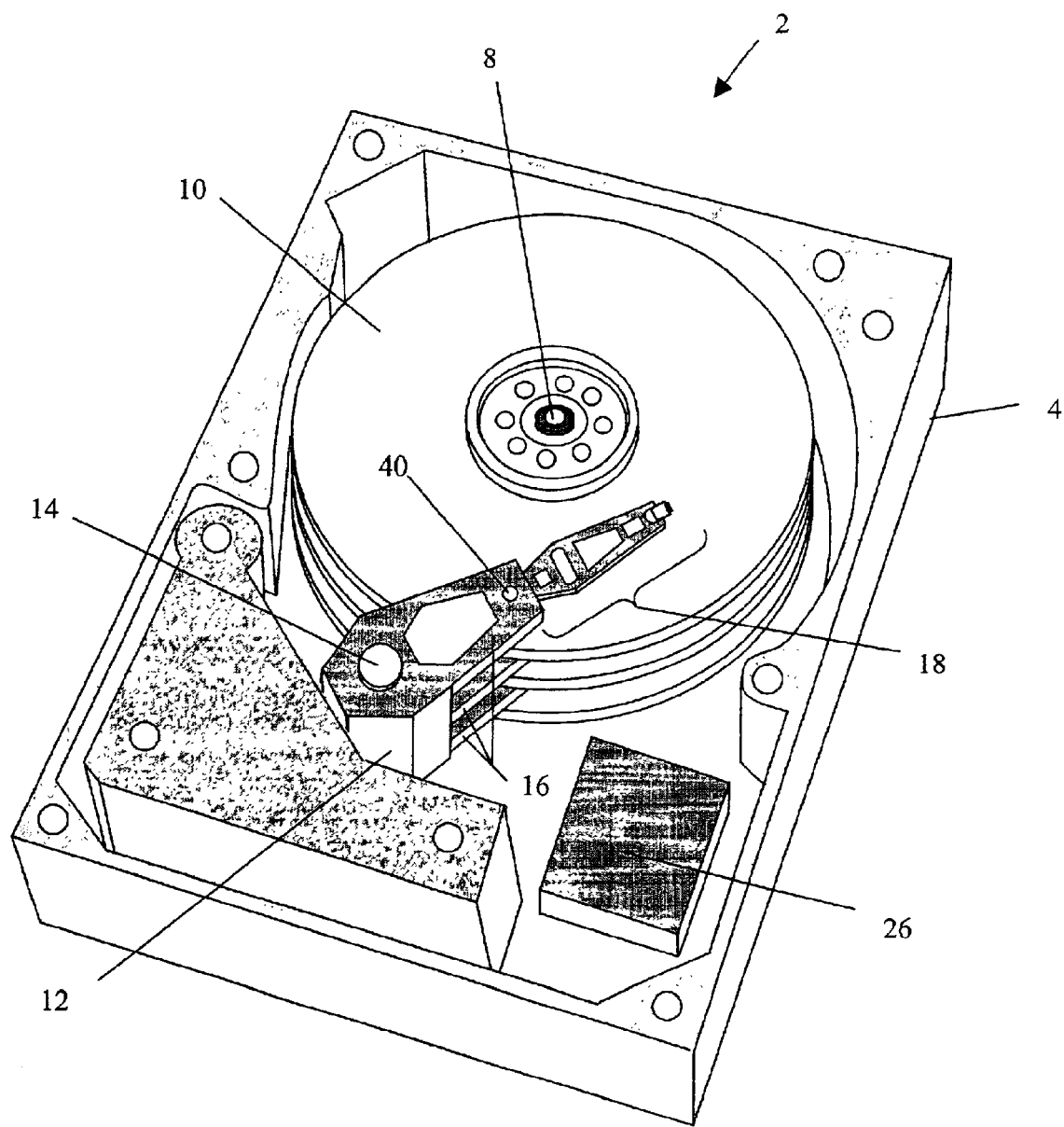
FIG. 1 is an interior perspective view of a magnetic disk drive that incorporates a read/write head suspension load beam fabricated in accordance with the invention.
Figure 2:
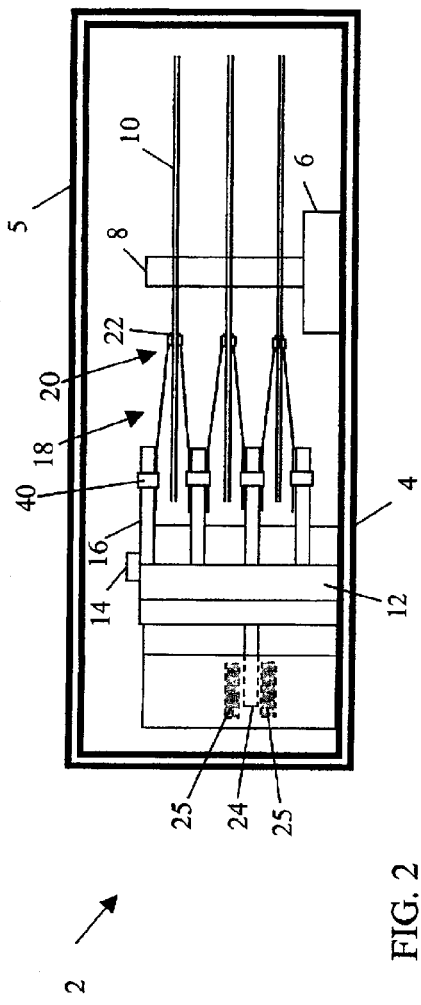
FIG. 2 is a simplified vertical sectional view of the magnetic disk drive of FIG. 1.
Figure 3:
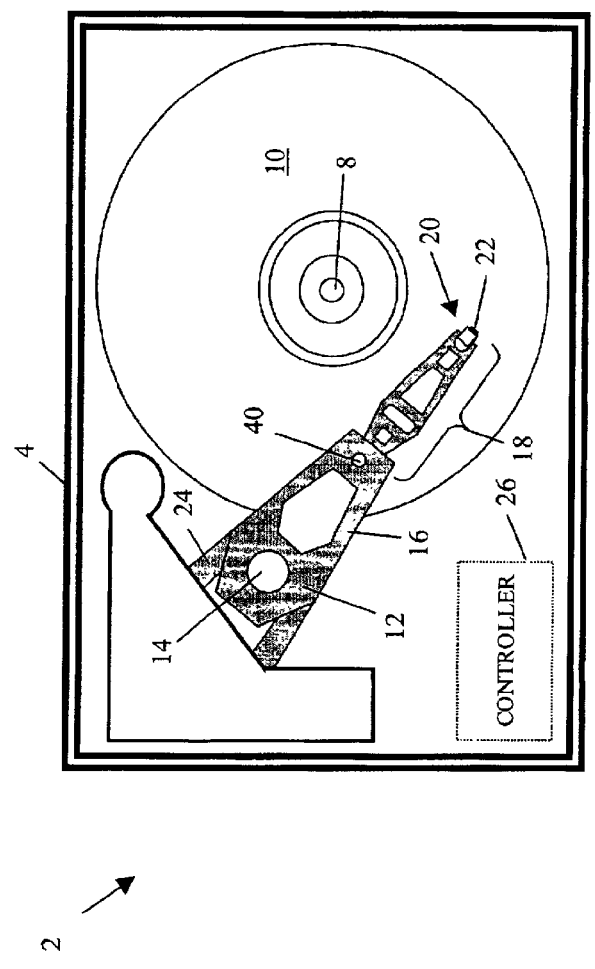
FIG. 3 is a simplified horizontal sectional view of the disk drive of FIG. 1.

Turning now to the figures, wherein like reference numerals represent like elements in all of the several views, FIGS. 1–3 illustrate a disk drive 2 having a suspension load beam (described below) that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes rigid actuator arms 16 that each carry one or two flexible suspensions 18. Each suspension 18 supports an air bearing slider 20 having a read/write transducer 22. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

There is preferably one transducer 22 associated with each of the upper and lower surfaces of the disks 10 (see FIG. 2), such that each disk surface is available for data storage. The transducers 22 are positionable to read and write data anywhere on the disk surfaces by pivoting the actuator 12 about the pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 2 and 3) that is driven by a pair of motor magnets 25 (see FIG. 2).

When the disk drive 2 is powered on, the disks 10 spin up to a desired rotational speed, such as 7400 rpm, 10,000 rpm or higher. This causes an upward air bearing force to develop between the disk surfaces and the sliders 20. This upward air bearing force is counteracted by the downward gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals, which carry both data and transducer position control information, are sent to the disk drive controller, shown diagrammatically at 26, for conventional processing. The controller 26 also generates write data signals during data write operations. The write data signals are delivered via circuitry carried by the actuator arms 16 and suspensions 18 to the write head elements of the transducers 22 for writing data onto the disks 10.

It will be appreciated that the foregoing description of the disk drive 2 is exemplary in nature, and that many other design configurations would be possible while still utilizing the suspension load beam manufacturing method of the invention.

Turning now to FIGS. 4–7, an exemplary method will be described for manufacturing a load beam for use in the suspension 18 of FIGS. 1–3. According this method, the fabrication of a load beam begins with the formation of a composite laminate material sheet 30 having first and second primary structural layers 32 and 34 sandwiching an intermediate secondary structural layer 36. The first and second primary layers 32 and 34, together with the secondary layer 36, are all made of structural load bearing material sheets that are preferably preformed. As such, the laminate material sheet 30 can be formed according to single fabrication operation wherein the material sheets are pressed together in a single roll-cladding operation or other conventional technique. Advantageously, no deposition or bonding steps are required.

Figure 4:
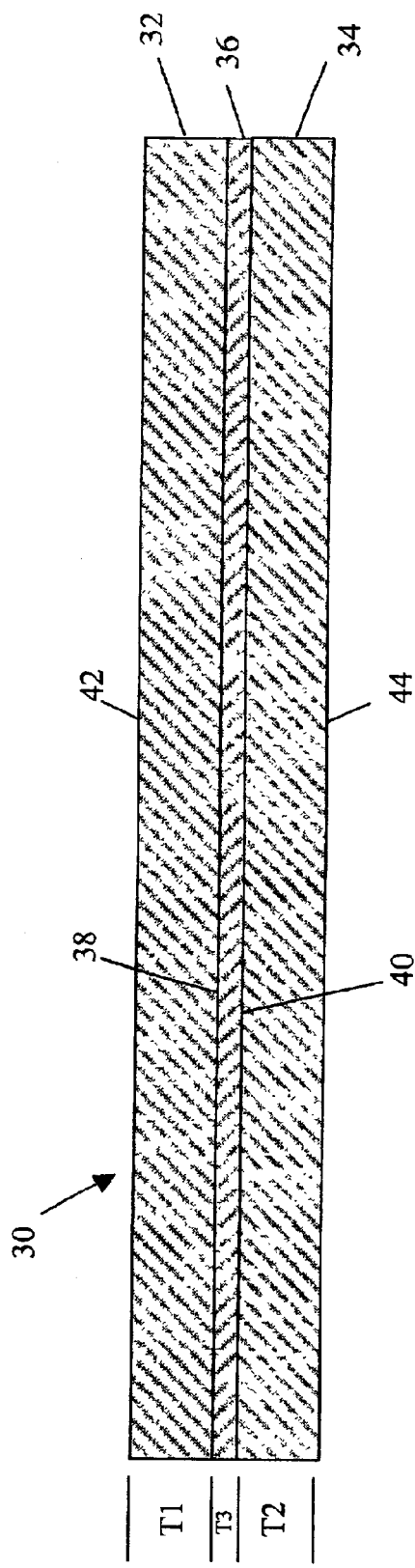
FIG. 4 is a diagrammatic cross-sectional view of a first laminate material sheet that is ready for etching to formed a load beam in accordance with the invention.
Figure 5:
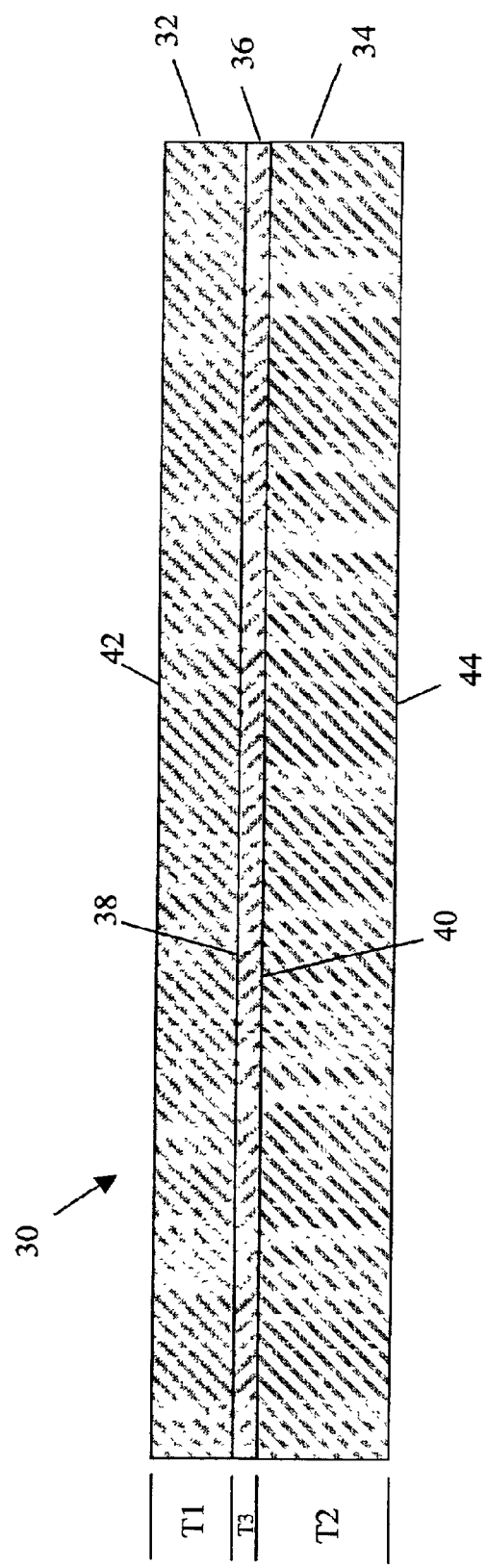
FIG. 5 is a diagrammatic cross-sectional view of another laminate material sheet that is ready for etching to formed a load beam in accordance with the invention.

Upon the formation of the laminate material sheet 30, the first primary layer 32 will facially engage a first side 38 of the secondary layer 36, and the second primary layer 34 will facially engage a second side 40 of the secondary layer. The first and second primary layers 32 and 34 will respectively define first and second surfaces 42 and 44 of the laminate material sheet 30, and will have respective first and second nominal thicknesses T1 and T2 lying in a direction that is substantially normal to the first and second surfaces 42 and 44 of the laminate material sheet. As shown in FIG. 4, the thicknesses T1 and T2 can be the same for each primary layer 32 and 34 (i.e., T1=T2). Alternatively, as shown in FIG. 5, the thicknesses T1 and T2 can be the different for each primary layer 32 and 34 (i.e., T1<or >T2). This feature can be used to provide better control over load beam vertical bending compliance. The secondary layer 36 has a thickness T3 that will typically be less than T1 or T2, but not significantly so insofar as the secondary layer 36 is intended to function as a structural (i.e., load bearing) layer.

Note that a variety of materials may be used to form the first and second primary layers 32 and 34, and the secondary layer 36, so long as the material providing the secondary layer is different than the material(s) providing the primary layers. More particularly, the secondary layer 36 should be made from a material that is resistant to the etching chemicals used to etch the primary layers. The most preferred material for the first and second primary layers 32 and 34 is stainless steel, full or ¾ hard, of Type 302 or 304. If the primary layers 32 and 34 are steel, the most preferred material for the secondary layer 36 will be copper, which has different etching properties than the steel (see below). Other materials may also be used. It should be further noted that the first and second primary layers 32 and 34 can be made of two different materials, provided the secondary layer 36 is made from a third material that is different from the materials used for the primary layers.

Turning now to FIGS. 6 and 7, it will be seen that the laminate material sheet 30 can be partially etched to form one or more areas of reduced thickness according to load beam design goals. In FIG. 6, a load beam design 50 is shown wherein the first and second primary layers 32 and 34 are of equal thickness (T1=T2) and wherein various areas of reduced thickness 52–60 are formed. The reduced thickness areas 52–58 are formed as weight reducing pockets, and the reduced thickness area 60 is formed as a load beam hinge. There is also an aperture 62 that is formed by a conventional fabrication method. In FIG. 7, a load beam design 70 is shown wherein the first and second primary layers 32 and 34 are of different thickness (T1<T2) and wherein various areas of reduced thickness 72–80 are formed. The reduced thickness areas 72–78 are formed as weight reducing pockets, and the reduced thickness area 80 is formed as a load beam hinge. There is also an aperture 82 that is formed by a conventional fabrication method.

The reduced thickness areas 52–60 and 72–80 of FIGS. 6 and 7 can be formed using a conventional photo-chemical etching process to etch into one or both of the primary layers 32 and 34 to remove material down to the secondary layer 36 at one or more locations on the surfaces 42 and 44 of the laminate material sheet 30. A suitable chemical etching solvent is selected for this process based on the material(s) used to form the primary layers 32 and 34. The secondary layer 36 should be made from a material that is resistant to the chemical etching solvent used to etch the primary layers 32 and 34. In this way, the secondary layer 36 will act as an etch stop to limit the depth of each etched area, thereby keeping thickness tolerances within acceptable limits. Note that some of the reduced thickness areas are formed by etching only one of the first or second primary layers 32 and 34. These reduced thickness areas are shown at 56, 58 and 60 in FIG. 6, and at 72, 74 and 76 in FIG. 7. As noted above, the areas 56 and 58 of FIG. 6, and the areas 72, 74 and 76 of FIG. 8 are mass reducing pockets, whereas the area 60 of FIG. 6 and the area 80 of FIG. 7 are hinges. Some of the reduced thickness areas are formed by etching both of the first and second primary layers 32 and 34 at opposing locations on the surfaces of the laminate material sheet 30. These reduced thickness areas are shown at 52 and 54 in FIG. 6 and at 78 in FIG. 7. Recall that all of these areas are mass reducing pockets.

Turning now to FIGS. 8–11, the principles of the invention will be further presented with reference to an exemplary suspension 100 that is fabricated according to the method disclosed above. Note that the suspension 100 has a configuration that has been selected for purposes of illustration only and not by way of limitation. Other configurations would also be possible, as exemplified below in the discussion of FIGS. 12–15.

Figure 11:
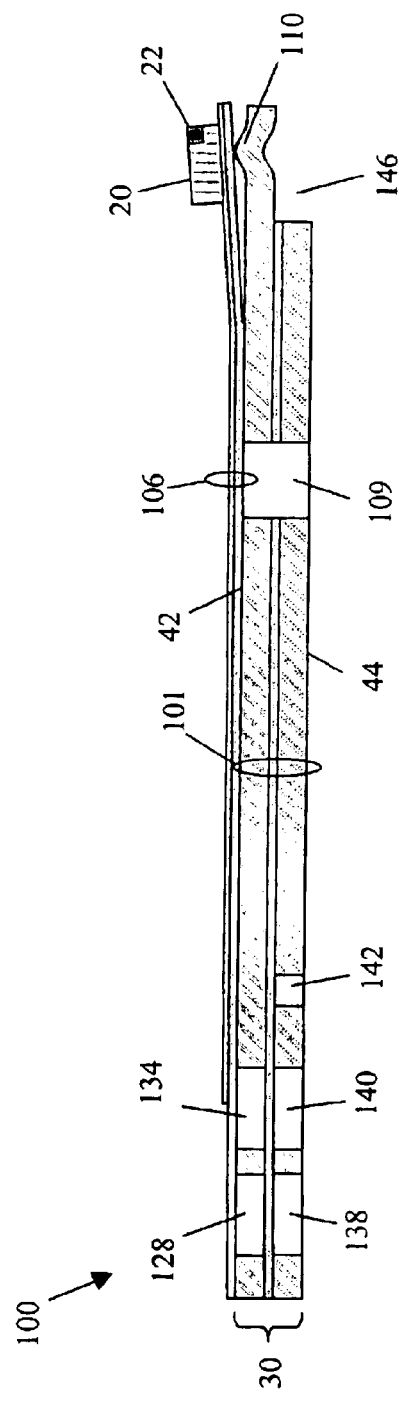
FIG. 11 is a cross-sectional view taken along line 11—11 in FIG. 9.

The suspension 100, which is shown in FIG. 9, is formed with the load beam 101 of FIG. 8. The load beam 101 includes a mount plate 102 adapted for mounting to one of the actuator arms 16 of FIGS. 1–3. The load beam 101 likewise includes a functional end 104 and mounts a flexure 106 that extends from the mount plate 102 to the functional end. As best shown in FIG. 11, the flexure 106 carries one of the sliders 20 and one of the read/write transducers 22 of FIGS. 1–3. The design of the flexure 106 is assumed to be conventional in nature, and thus includes, among other things, a conductive layer providing electrical lead traces 107 (see FIG. 9).

The load beam's mount plate 102 includes a large attachment aperture 108 (shown in FIGS. 8 and 9 only) that allows the load beam 101 to be attached to an associated one of the actuator arms 16 by way of a conventional swage or rivet connector 40 (see FIGS. 1–3). Another aperture 109 can be formed near the load beam's functional end 104. The functional end 104 also includes a dimple 110 for gimbaling the flexure 106. A conventional load/unload tab can also be formed at the functional end 104, but is not shown insofar as it is not relevant to the present discussion.

Disposed at the mount plate 102 are attachment pad locations 112, 114, 116 and 118 for securing the flexure 106 to the load beam 101. As shown in FIG. 9, rivets or welds 120, 122, 124 and 126 are used to secure the flexure 106 to the respective attachment pad locations 112, 114, 116 and 118. At the functional end 104, the flexure 106 rests on the dimple 110 so that a gimbaling arrangement is provided that allows the slider 22 to pitch and roll during disk drive operation. Although not shown, the flexure 106 is also preferably attached to the load beam 101 at additional locations between the mount plate 102 and the functional end 104.

Figure 10:
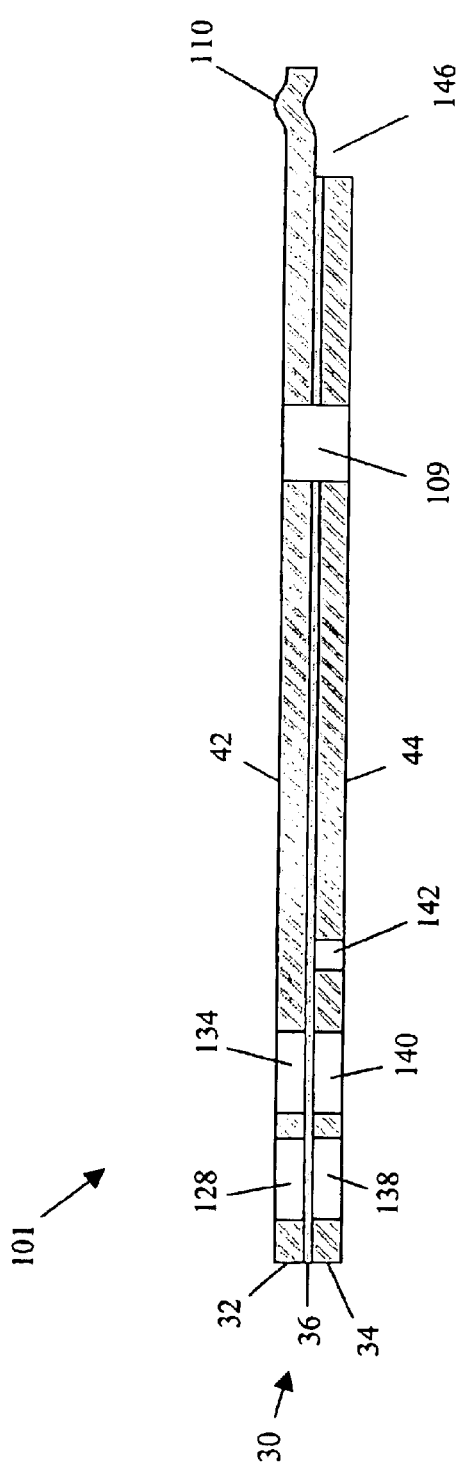
FIG. 10 is a cross-sectional view taken along line 10—10 in FIG. 8.

As illustrated in FIGS. 10 and 11, the load beam 101 can be made from the same laminate material sheet 30 shown in FIGS. 4 and 5. The load beam 101 will thus include first and second primary structural layers 32 and 34 sandwiching a secondary structural layer 36, and it will have first and second surfaces 42 and 44. This allows the load beam 101 to undergo partial etching to form various reduced thickness areas having a precise thickness dimension resulting from the secondary layer 36 acting as an etch stop layer. The reduced thickness areas of the load beam 100 include five mass reducing pockets formed in the first surface 42 of the laminate material sheet 30. These pockets are best shown in FIGS. 12 and 13 and are designated by reference numbers 128, 130, 132, 134 and 136. Three more mass reducing pockets are formed in the second surface 44 of the laminate material sheet 30 at locations that correspond to and oppose the pockets 128, 130 and 134. Two such pockets, designated by reference numerals 138 and 140, are shown in FIGS. 10 and 11.

In addition to the mass reducing pockets 128–140, another reduced thickness area is formed adjacent the mount plate 102 by etching the second surface 44 of the laminate material sheet 30 to define a hinge 142. An aperture 144 is also formed in this area.

A final reduced thickness area 146 is formed at the load beam functional end 104 by partially etching the second primary layer 34 from the second surface 44 down to the secondary layer 36, and then etching the secondary layer down to the first primary layer 32. The dimple 110 can be made by conventionally forming the first primary layer 32, which is intact and unetched.

Turning now to FIGS. 12–15, a suspension 100a is shown that is similar in most respects to the suspension 100, but its load beam 101a is etched to provide an integrated gimbal suspension rather than a dimpled suspension. Accordingly, with the exception of the dimple 110 and the reduced thickness area 146, all of the structural features shown and described relative to FIGS. 8–11 are present in FIGS. 12–15, as indicated by the use of corresponding reference numerals bearing the subscript "a". The description of such features will not be repeated here.

To form the integrated gimbal suspension, a reduced thickness area 150 is formed at the load beam functional end 104 by etching the second primary layer 34 from the second surface 44 down to the secondary layer 36. A pair of shaped apertures 152 are then formed in conventional fashion in the reduced thickness area 150 to define a slider support tab 154. As shown in FIGS. 14 and 15, the tab 154 provides a mounting surface for the slider 20 in a gimbaled arrangement.

Accordingly, a method for manufacturing a suspension load beam has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method of manufacturing a disk drive suspension load beam, comprising:
   laminating first, second and third structural load bearing preformed metallic material sheets into a composite laminate metallic material sheet with said first and second material sheets defining first and second primary laminate layers that sandwich said third material sheet as an intermediate secondary laminate layer;
   said secondary layer being made of a different material then either of said first and second primary layers; and forming one or more areas of reduced thickness in said laminate material sheet by etching one or both of said first and second primary layers down to said secondary layer at one or more locations on said laminate material sheet.

2. A method in accordance with claim 1 wherein said primary layers are made from stainless steel and said secondary layer is made from copper.

3. A method in accordance with claim 1 wherein said first and second primary layers are of substantially equal thickness.

4. A method in accordance with claim 1 said first and second primary layers are of different thickness.

5. A method in accordance with claim 1 wherein said one or more areas of reduced thickness include one or more areas formed by etching only one of said first or second primary layers.

6. A method in accordance with claim 1 wherein said one or more areas of reduced thickness include a load beam hinge.

7. A method in accordance with claim 1 wherein said one or more areas of reduced thickness include one or more pockets designed to reduce load beam mass.

8. A method in accordance with claim 7 wherein said one or more pockets include single layer pockets formed in only one surface of said laminate material sheet.

9. A method of manufacturing a disk drive suspension load beam, comprising:

laminating first, second and third structural load bearing material sheets into a composite laminate material sheet with said first and second material sheets defining first and second primary laminate layers that sandwich said third material sheet as an intermediate secondary laminate layer;

said secondary layer being made of a different material than either of said first and second primary layers;

forming one or more areas of reduced thickness in said laminate material sheet by etching one or both of said first and second primary layers down to said secondary layer at one or more locations on said laminate material sheet; and wherein said one or move areas of reduced thickness include one or more areas formed by etching both of said first and second primary layers.

10. A method of manufacturing a disk drive suspension load beam, comprising:

laminating first, second and third structural load bearing material sheets into a composite laminate material sheet with said first and second material sheets defining first and second primary laminate layers that sandwich said third material sheet as an intermediate secondary laminate layer;

said secondary layer being made of a different material than either of said first and second primary layers;

forming one or more areas of reduced thickness in said laminate material sheet by etching one or both of said first and second primary layers down to said secondary layer at one or more locations on said laminate material sheet, wherein said one or more areas of reduced thickness include one or more pockets designed to reduce load beam mass; and wherein said one or more pockets include dual layer pockets formed in two surfaces of said laminate material sheet at opposing locations thereon.

11. In a disk drive suspension assembly mounting a transducer-carrying slider, said suspension assembly comprising:

a suspension load beam formed from a composite laminate metallic material sheet that includes first and second primary layers respectively comprising first and second structural load bearing preformed metallic material sheets sandwiching an intermediate secondary layer comprising a third structural load bearing preformed metallic material sheet;

said secondary layer being made of a different material than either of said first and second primary layers; and one or more areas of reduced thickness etched into one or both of said primary layers down to said secondary layer at one or more locations on said laminate material sheet.

12. A suspension assembly in accordance with claim 11 wherein said primary layer are made from stainless steel and said secondary layer is made from copper.

13. A suspension assembly in accordance with claim 11 wherein said first and second primary layers are of substantially equal thickness.

14. A suspension assembly in accordance with claim 11 wherein first and second primary layers are of different thickness.

15. A suspension assembly in accordance with claim 11 wherein said one or more areas of reduced thickness include one or more areas formed by etching only one of said first or second primary layers.

16. A suspension assembly an accordance with claim 11 wherein said one or more areas of reduced thickness include a load beam hinge.

17. A suspension assembly in accordance with claim 11 wherein said one or more areas of reduced thickness include one or more pockets designed to reduce load beam mass.

18. A suspension assembly in accordance with claim 17 wherein said one or more pocket include single layer pockets formed in only one surface of said laminate material sheet.

19. In a disk drive suspension assembly mounting a transducer-carrying slider, said suspension assembly comprising:

a suspension load beam formed from a composite laminate material sheet that includes first and second primary layers respectively comprising first and second structural load bearing material sheets sandwiching an intermediate secondary layer comprising a third structural load bearing material sheet;

said secondary layer being made of a different material than either of said first and second primary layers;

one or more areas of reduced thickness etched into one or both of said primary layers down to said secondary layer at one or more locations on said laminate material sheet; and wherein said one or more areas of reduced thickness include one or more areas formed by etching both of said first and second primary layers.

20. In a disk drive suspension assembly mounting a transducer-carrying slider, said suspension assembly comprising:

a suspension load beam formed from a composite laminate material sheet that includes first and second primary layers respectively comprising first and second structural load bearing material sheets sandwiching an intermediate secondary layer comprising a third structural load bearing material sheet;

said secondary layer being made of a different material than either of said first and second primary layers;

one or more areas of reduced thickness etched into one or both of said primary layers down to said secondary layer at one or more locations on said laminate material sheet;

wherein said one or more areas of reduced thickness include one or more pockets designed to reduce load beam mass; and wherein said one or more pockets include dual layer pockets formed in two surfaces of said laminate material sheet at opposing locations thereon.

21. In a disk drive having a housing, a rotatable magnetic recording medium in the housing, an actuator carrying an actuator arm, a suspension assembly, a slider and a read/write transducer, said suspension assembly comprising:

a suspension load beam formed from a composite laminate metallic material sheet that includes first and second primary layers respectively comprising first and second structural load bearing preformed metallic material sheets sandwiching an intermediate secondary layer comprising a third structural load bearing preformed metallic material sheet;

said secondary layer being made of a different material than either of said first and second primary layers; and one or more areas of reduced thickness etched into one or both of said primary layers down to said secondary layer at one or more locations on said laminate material sheet.

22. A disk drive in accordance with claim 21 wherein said primary layers are made from stainless steel and said secondary layer is made from copper.

23. A disk drive in accordance with claim 21 wherein said first and second primary layers are of substantially equal thickness.

24. A disk drive in accordance with claim 21 wherein said first and second primary layers are of different thickness.

25. A disk drive in accordance with claim 21 wherein said one or more areas of reduced thickness include one or more areas formed by etching only one of said first or second primary layers.

26. A disk drive in accordance with claim 21 wherein said one or more areas of reduced thickness include a load beam hinge.

27. A disk drive in accordance with claim 21 wherein said one or more areas of reduced thickness include one or more pockets designed to reduce load beam mass.

28. A disk drive in accordance with claim 27 wherein said one or more pockets include single layer pockets formed in only one surface of said laminate material sheet.

29. In a disk drive having a housing, a rotatable magnetic recording medium in the housing, an actuator carrying an actuator arm, a suspension assembly, a slider and a red/write transducer, said suspension assembly comprising;

a suspension load beam formed from a composite laminate material sheet that includes first and second primary layers respectively comprising first and second structural load bearing material sheets sandwiching an intermediate secondary layer comprising a third structural load bearing material sheet;

said secondary layer being made of a different material than either of said first and second primary layers;

one or more areas of reduced thickness etched into one or both of said primary layers down to said secondary layer at one or more locations on said laminate material sheet; and wherein said one or more areas of reduced thickness include one or more areas formed by etching both of said first and second primary layers.

30. In a disk drive having a housing, a rotatable magnetic recording medium in the housing, an actuator carrying an actuator arm, a suspension assembly, a slider and a read/write transducer, said suspension assembly comprising:

a suspension load beam formed from a composite laminate material sheet that includes first and second primary layers respectively comprising first and second structural load bearing material sheets sandwiching an intermediate secondary layer comprising a third structural load bearing material sheet;

said secondary layer being made of a different material than either of said first and second primary layers;

one or more areas of reduced thickness etched into one or both of said primary layers down to said secondary layer at one or more locations on said laminate material sheet;

wherein said one or more areas of reduced thickness include one or more pockets designed to reduce load beam mass; and wherein said one or more pockets include dual layer pockets formed in two surfaces of said laminate material sheet at opposing locations thereon.

31. A method of manufacturing a disk drive suspension load beam, comprising:

laminating first, second and third preformed metallic material sheets into a composite laminate metallic material sheet with said first and second material sheets defining first and second primary laminate layers that sandwich said third material sheet as an intermediate secondary laminate layer;

said secondary layer being made of a structural load bearing material that is different than a material used for either of said first and second primary layers; and forming one or more areas of reduced thickness in said laminate material sheet by etching one or both of said first and second primary layers down to said secondary layer at one or more locations on said laminate material sheet.

32. In a disk drive suspension assembly mounting a transducer-carrying slider, said suspension assembly comprising:

a suspension load bean formed from a composite laminate metallic material sheet that includes first and second primary layers respectively comprising first and second preformed metallic material sheets sandwiching an intermediate secondary layer comprising a third preformed metallic material sheet;

said secondary layer being made of a structural load bearing material that is different than a material used for either of said first and second primary layers; and one or more areas of reduced thickness etched into one or both of said primary layers down to said secondary layer at one or more locations on said laminate material sheet.

33. In a disk drive having a housing, a rotatable magnetic recording medium in the housing, an actuator carrying an actuator arm, a suspension assembly, a slider and a read/write transducer, said suspension assembly comprising:

a suspension load beam formed from a composite laminate metallic material sheet that includes first and second primary layers respectively comprising first and second preformed metallic material sheets sandwiching an intermediate secondary layer comprising a third preformed metallic material sheet;

said secondary layer being made of a structural load bearing material that is different than a material used for either of said first and second primary layers; and one or more areas of reduced thickness etched into one or both of said primary layers down to said secondary layer at one or more locations on said laminate material sheet.

* * * * *